F. S. KINNEY.
Testing Machine.
No. 204,901. Patented June 18, 1878.
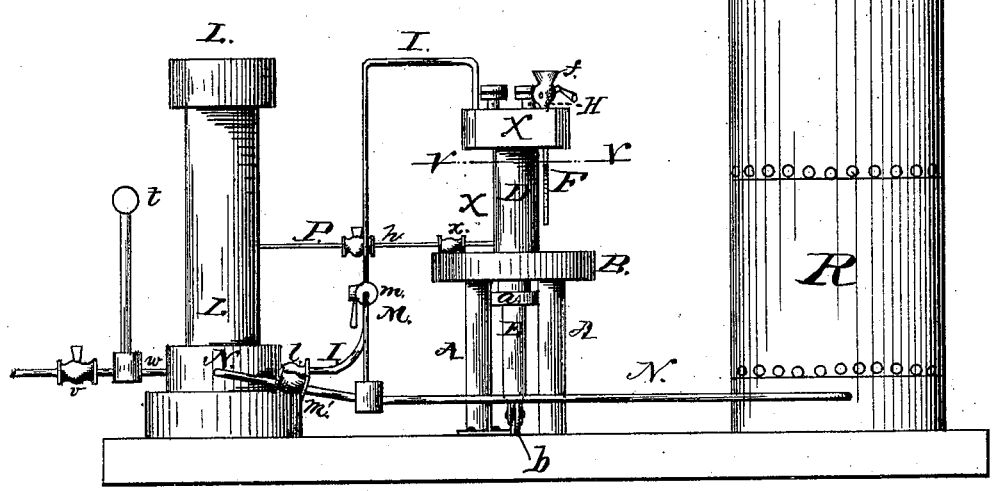
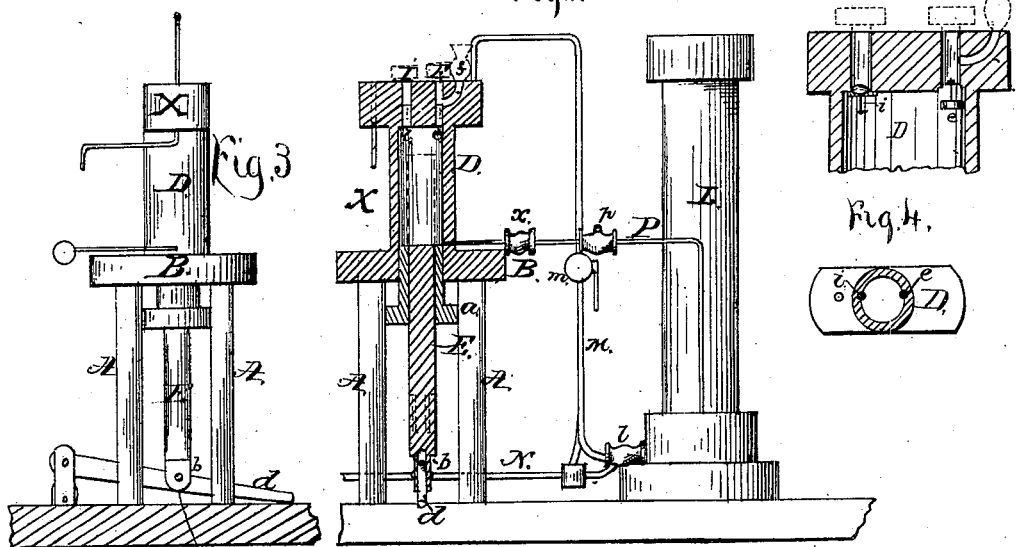
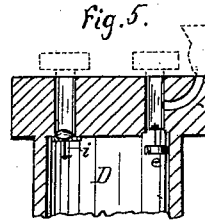

UNITED STATES PATENT OFFICE.

FRANCIS S. KINNEY, OF NEW YORK, N. Y.

IMPROVEMENT IN TESTING-MACHINES.

Specification forming part of Letters Patent No. 204,901, dated June 18, 1878; application filed December 13, 1877.

*To all whom it may concern:*

Be it known that I, FRANCIS S. KINNEY, of New York, in the county of New York and State of New York, have invented a new and useful Improvement in Testing-Machines, of which the following is a specification, reference being had to the accompanying drawings.

The invention relates to an improvement in devices for testing boilers, lintels, beams, or columns; and consists in a pump and connections arranged to supply condensed air or water, or both simultaneously, to a magazine, wherefrom the water or fluid under pressure may be led to the device to be tested, the connections being such that when any desired pressure is exceeded the surplus pressure will be relieved into the magazine containing fluid under elastic (air) pressure, and indicated by a suitable gage, thus preventing accident or the exertion of an excessive test. Or the pump may be used by itself as an air-pump or as a water-pump, and in the latter capacity may be connected with the boiler to be tested, so that a continuous pressure may be exerted thereon and any leakage supplied, the pump being connected with a magazine, so that when the pressure upon the boiler becomes excessive a valve in the connection between the pump and magazine lifts, and the pressure is relieved to an equality with that in the magazine. When charged, the magazine, being directly attached to the boiler, furnishes another means of testing the same.

The above testing capacities may be applied readily to the testing of lintels, &c., through their application to a hydraulic ram.

The object of the invention is to provide a testing device operating through the agency of fluid under elastic pressure, or communicating a continuous fluid-pressure equal to the said elastic pressure, in such manner as to prevent accident and avoid the exertion of undue force.

Figure 1 is a side elevation of the invention. Fig. 2 is a like view, partly in section, of same. Fig. 3 is a detached side view of the pump, and Fig. 4 is a detached sectional view through the line V V of Fig. 1.

In the accompanying drawings, A represents the standards sustaining the table B, at the center of which is placed the pump X, having the cylinder D, the plunger E of which passes through the table B, and is provided on its lower end with a packing, $a$, to insure an air-tight fit, the plunger being operated by the rod $b$, having at its lower end the pump-handle $d$. Thus the pump operates in an inverted position.

The diameter of the plunger E is somewhat less than that of the interior of the pump-cylinder, so as to allow a space for the accumulation of water in the cylinder and about the plunger, to permit the pump to be effectively used as an air-pump.

Into the upper end of the cylinder D is led the water-supply pipe F, which opens into the same channel as the adjacent air-supply pipe H, the entrance of which channel is controlled by the upward-acting check-valve $e$, placed in the channel just above the inner surface of the top of the cylinder, and thus prevents the escape of water or air through the pipes F and H when the plunger rises. The upper end of the pipe H is provided with the cup-valve $f$, through which fluid or air may be introduced into the cylinder. The cylinder is also furnished with a discharge-pipe, I, having a downward-acting check-valve, $i$, near the place where it enters the cylinder, the pipe leading to the base of the magazine L, adjacent to which it has the check-valve $l$, that lifts toward the magazine. From the pipe I a pipe, M, provided with the valve $m$, leads to the pipe N, one end of which is connected with the boiler R to be tested, the other with the lower part of the magazine L, being provided with the valve $m'$, placed in the pipe N, between its junction with the pipe M and the magazine.

An induction-pipe, P, provided with the check-valve $p$, leads from the base of the pump-cylinder D to the base of the magazine. This pipe should also have a valve, $x$, of such dimensions as to permit the reflux only of sufficient water from the magazine to supply the quantity required with the elevated plunger to fill the cylinder and adjacent cavities, and thus to expel all the air therein when the pump is operating as an air-pump. In other words, the water supplied from the magazine will, with the plunger, completely fill the cylinder and replace the exhaustion, leakage, and waste of fluid.

It is plain that the pipe P may be dispensed with or connected with a tank of water, preferably cool, in order to chill the air fed to the magazine, which should be supplied with a pressure-gage, $t$, and an exhaust or blow-off pipe, $w$, having a valve, $v$, these devices being respectively for the purpose of indicating or reducing the pressure in the magazine.

The operation is as follows: The connections between the pump and boiler are closed and the cylinder of the pump supplied through the cup-valve $f$ with water sufficient to fill up the cylinder as to all space therein or contiguous thereto not occupied by the plunger when elevated. The plunger being now depressed, a vacuum is created in the cylinder, and air is drawn therein through the cup-valve $f$. The plunger is next elevated, which closes the check-valve $e$ and forces the air with a small quantity of water through the pipe I into the magazine L. This operation is continued until the required density of air is acquired in the magazine. The air supply is now shut off and the pump operated to force water into the magazine, further increasing the density and pressure of the air therein, the intent being to supply the magazine with a sufficient quantity of water to fill it above and prevent the escape of air through the mouths of the pipes leading from the magazine, which is thus made to contain a body of water under air-pressure.

The valve $x$ between the pump and magazine is now closed, also the cup-valve $f$, the valve $m$ being opened and the pump operated until the boiler R is filled with water. The operation of the pump is still, however, continued. Now, the instant that the pressure on the boiler occasioned by this continuous supply of water exceeds that in the magazine the check-valve $l$ lifts, the water rushes from the pipe I into the magazine, the gage whereon at once indicates that the desired pressure has been exceeded. To continue the pressure on the boiler, it is only necessary to close the valve $m$ and open the valve $m'$ on the pipe between the magazine and boiler, using the pump to supply any waste and to maintain the pressure at or above a certain pressure.

The power above indicated can be applied to a hydraulic ram or to the testing of any kind of pipes, chambers, or other hollow structures.

What I claim as my invention, and desire to secure by Letters Patent, is—

1. A testing-machine in which the column of liquid under continuous pressure is relieved against another column of liquid under elastic pressure, substantially as specified.

2. A machine for testing boilers and analogous structures in which is employed a column of liquid under invariable continuous pressure, substantially as specified.

3. A device for testing wherein an undue pressure is prevented by a check-valve that lifts when the undue pressure is reached, and thus opens communication with a body of liquid under elastic pressure, substantially as specified.

4. A pump connected with a boiler or analogous structure, or a ram, in combination with a pipe having a check-valve that opens toward a magazine of liquid under elastic pressure, substantially as set forth.

5. The pump-cylinder D, provided with the plunger E and check-valve $e$, controlling the air and liquid supply, in combination with the check-valve $i$, controlling the exhaust-pipe, substantially as set forth.

6. The supply-pipe P, provided with the valve $x$ and check-valve $p$, substantially as and for the purposes specified.

In testimony that I claim the foregoing improvement in testing-machines, as above described, I have hereunto set my hand this 7th day of December, 1877.

FRANCIS S. KINNEY.

Witnesses:
JOHN A. O'BRIEN,
LOUIS PLOEGER.